United States Patent
Lehmann

(10) Patent No.: US 9,191,055 B2
(45) Date of Patent: Nov. 17, 2015

(54) METHOD AND SYSTEM TO MINIMIZE RADIATION EXPOSURE FROM MOBILE PHONES AND DEVICES

(75) Inventor: Harry V. Lehmann, Novato, CA (US)

(73) Assignee: Green Swan, Inc., Novato, CA (US)

( * ) Notice: Subject to any disclaimer, the term of this patent is extended or adjusted under 35 U.S.C. 154(b) by 1327 days.

(21) Appl. No.: 12/978,142

(22) Filed: Dec. 23, 2010

(65) Prior Publication Data

US 2011/0159920 A1    Jun. 30, 2011

Related U.S. Application Data

(60) Provisional application No. 61/290,492, filed on Dec. 28, 2009, provisional application No. 61/290,493, filed on Dec. 28, 2009, provisional application No. 61/290,854, filed on Dec. 29, 2009, provisional (Continued)

(51) Int. Cl.
*H03C 1/62* (2006.01)
*H04B 17/00* (2015.01)
*H04B 1/3827* (2015.01)
*H04M 1/02* (2006.01)

(52) U.S. Cl.
CPC ........... *H04B 1/3838* (2013.01); *H04M 1/0202* (2013.01)

(58) Field of Classification Search
USPC ............. 455/115.1–115.4, 126, 127.1, 67.11, 455/67.14–67.7, 117, 575.5, 575.8, 556.1, 455/556.2, 41.1–41.3
See application file for complete search history.

(56) References Cited

U.S. PATENT DOCUMENTS

| 4,910,464 A * | 3/1990 | Trett et al. ............. 327/517 |
| 5,335,366 A | 8/1994 | Daniels |
| 5,336,896 A | 8/1994 | Katz |

(Continued)

FOREIGN PATENT DOCUMENTS

| GB | 2327572 A | 1/1999 |
| WO | 2009/130165 A2 | 10/2009 |

*Primary Examiner* — Edward Urban
*Assistant Examiner* — Rui Hu
(74) *Attorney, Agent, or Firm* — Duane Morris LLP

(57) ABSTRACT

Mobile devices may minimize the radiation exposure to users by controlling the distance between the user, specifically the head, and the mobile device to a minimum distance. The reduction in exposure is realized due to the operation of the Inverse Square Rule on electromagnetic signal from the mobile device recognizing there is a steep fall off of signal strength resultant from increased distance between the head of the user and the source of the signal. Embodiments increase and maintain operational distance between the user and the broadcast device to reduce signal absorption. Enabled mobile devices increase and maintain the operational distance by detecting when the distance is breached by a variety of methods and then alerting the user. Sound and electromagnetic waves may be used to determine the proximity of the mobile device to the user, in addition image processing typically resident on some mobile devices may also be used to determine proximity to the user. Embodiments disable harmful features such as broadcasting when the operation distance is breached for a period of time or the radiation exposure exceeds a threshold. Other embodiments enforce the operational distance with physical barriers preventing the distance from being reduced. Embodiments influence the user to maintain a minimum distance via alerts, interruptions and warnings. Thus maintaining a minimum distance between the user and the transmitter may have a dramatic practical effect.

1 Claim, 15 Drawing Sheets

Related U.S. Application Data application No. 61/312,060, filed on Mar. 9, 2010, provisional application No. 61/312,159, filed on Mar. 9, 2010, provisional application No. 61/315,316, filed on Mar. 18, 2010, provisional application No. 61/316,778, filed on Mar. 23, 2010, provisional application No. 61/332,021, filed on May 6, 2010, provisional application No. 61/377,824, filed on Aug. 27, 2010.

(56) References Cited

U.S. PATENT DOCUMENTS

| | | | |
|---|---|---|---|
| 5,524,275 A * | 6/1996 | Lindell | 455/117 |
| 5,541,609 A | 7/1996 | Stutzman et al. | |
| 5,956,626 A * | 9/1999 | Kaschke et al. | 455/115.1 |
| 6,404,403 B1 | 6/2002 | Kunz et al. | |
| 6,456,856 B1 | 9/2002 | Werling et al. | |
| 6,505,036 B2 | 1/2003 | Zilberberg et al. | |
| 6,785,519 B2 | 8/2004 | Toyoda et al. | |
| 6,934,515 B2 * | 8/2005 | Wallach | 455/67.13 |
| 6,985,113 B2 * | 1/2006 | Nishimura et al. | 343/702 |
| 7,146,139 B2 * | 12/2006 | Nevermann | 455/115.1 |
| 7,499,722 B2 | 3/2009 | McDowell et al. | |
| 7,511,513 B2 * | 3/2009 | Nevermann | 324/644 |
| 7,633,076 B2 * | 12/2009 | Huppi et al. | 250/559.36 |
| 8,023,984 B2 * | 9/2011 | Jin et al. | 455/522 |
| 8,326,385 B2 * | 12/2012 | Brogle et al. | 455/575.7 |
| 8,406,814 B2 * | 3/2013 | Bychkov et al. | 455/565 |
| 8,417,296 B2 * | 4/2013 | Caballero et al. | 455/566 |
| 8,466,839 B2 * | 6/2013 | Schlub et al. | 343/702 |
| 8,483,632 B2 * | 7/2013 | Asrani et al. | 455/117 |
| 8,577,289 B2 * | 11/2013 | Schlub et al. | 455/41.1 |
| 8,629,771 B2 * | 1/2014 | Anderson et al. | 340/552 |
| 8,744,539 B2 * | 6/2014 | Pourseyed et al. | 455/575.7 |
| 8,781,420 B2 * | 7/2014 | Schlub et al. | 455/127.2 |
| 8,798,695 B1 * | 8/2014 | Zheng et al. | 455/575.7 |
| 2002/0028699 A1 * | 3/2002 | Moquin et al. | 455/569 |
| 2002/0071551 A1 | 6/2002 | Lee | |
| 2002/0075189 A1 * | 6/2002 | Carillo et al. | 343/702 |
| 2005/0032474 A1 * | 2/2005 | Gordon | 455/41.1 |
| 2005/0113125 A1 * | 5/2005 | Kang | 455/522 |
| 2007/0247299 A1 * | 10/2007 | Richards | 340/500 |
| 2009/0096683 A1 * | 4/2009 | Rosenblatt et al. | 343/702 |
| 2009/0125083 A1 | 5/2009 | Maples | |
| 2011/0050446 A1 * | 3/2011 | Anderson et al. | 340/686.6 |
| 2012/0077538 A1 * | 3/2012 | Yun | 455/522 |
| 2013/0252658 A1 * | 9/2013 | Wilson et al. | 455/522 |

\* cited by examiner

METHOD AND SYSTEM TO MINIMIZE RADIATION EXPOSURE FROM MOBILE PHONES AND DEVICES

CROSS REFERENCE

This application is a non-provisional application claiming priority of provisional applications: Application No. 61/290,492 entitled METHOD AND DEVICE FOR RADIO WAVE SHIELDING THROUGH INCORPORATION OF DIELECTRIC MATERIAL WAVE BARRIER IN ELECTRONIC DEVICE filed Dec. 28, 2009; Application No. 61/290,493 entitled METHOD AND DEVICE FOR RADIO WAVE SHIELDING THROUGH INCORPORATION OF A TRANSPARENT, SEMI-TRANSPARENT, OR OPAQUE DIELECTRIC filed Dec. 28, 2009; Application No. 61/290,854 entitled METHOD AND DEVICE FOR RADIO WAVE SHIELDING THROUGH INCORPORATION OF A TRANSPARENT, SEMI-TRANSPARENT, OR OPAQUE OR SOLID DIELECTRIC WAVE BARRIER FOR THE FACEPLATE OF ELECTRONIC COMMUNICATION DEVICES, INCLUDING CELLULAR TELEPHONE, PORTABLE TELEPHONE, AND HANDHELD RADIO AND ENTERTAINMENT DEVICES filed Dec. 29, 2009; Application No. 61/312,060 entitled HINGED FOLD-OVER SWITCH ACTIVATING DISTANCE INSERTION DEVICE filed Mar. 9, 2010; Application No. 61/312,159 entitled SPRING-LOADED SWING-OUT ARM DISTANCE INSERTION DEVICE FOR APPLICATION TO CELLULAR TELEPHONES filed Mar. 9, 2010; Application No. 61/315,316 entitled SONIC-SWITCH DISTANCE WARNING DEVICE FOR APPLICATION TO CELLULAR TELEPHONES filed Mar. 18, 2010; Application No. 61/316,778 entitled DEPTH OF FIELD TUNED AND PATTERN RECOGNITION PROXIMITY WARNING DEVICE AND METHOD FOR APPLICATION TO CELLULAR TELEPHONES AND OTHER RADIO TRANSMISSION EQUIPMENT filed Mar. 23, 2010; Application No. 61/332,021 entitled PROXIMITY WARNING SOFTWARE FOR CELLULAR TELEPHONES APPLICATIONS filed May 6, 2010; and Application No. 61/377,824 entitled ANGLE OF INCIDENCE MEASUREMENT BASED WARNING DEVICE FOR CELL TELEPHONES filed Aug. 27, 2010. The entirety of each referenced provisional application is incorporated herein by reference.

This application is also co-pending and claims priority benefit of non-provisional application Ser. No. 12/979,712 entitled METHOD AND SYSTEM TO SHIELD MOBILE PHONES AND DEVICES TO MINIMIZE RADIATION EXPOSURE filed Dec. 23, 2010. The entirety of which is also incorporated herein by reference.

BACKGROUND

The disclosed subject matter is directed to minimizing the exposure to electromagnetic waves and non-ionizing radiation due to use of mobile appliances. This disclosure uses mobile device, mobile appliance, cell phone, cellular phone, wireless phone, wireless device, mobile phone and mobile radio, as well as phone, telephone, cell and radio interchangeably and the use of such terms is not exclusive and is intended to encompass all communication devices and apparatuses that transmit radio waves during communications and are held or located in close proximity to the user.

Microwaves are absorbed by living tissues at 24 times the rate of their absorption by pure water. While the Specific Absorption rate, one standard by which cellular microwave absorption by the body is commonly measure, is typically based upon a penetration through an inert emulation of a human head, competent experimental work indicates that the level of absorption in living tissue is many times greater than the level of microwave absorption through an inert liquid, such as water.

In a 1983 article entitled An Optical Method for Investigating the Microwave Characteristics of DNA and other Biomolecules in Solution, by Mays L. Swicord and Christopher C. Davis, published in the journal Bioelectronmagnetics, experimental results were reported which determined that "A significant increase in the absorption of DNA solutions as compared with pure water has been observed that is consistent with microwave absorption by the longitudinal mode of the double helix". Thus, in their conclusion Swicord and Davis state that: However, the results presented in this work are in good agreement with the Prohofsky model of acoustic mode absorption by varying lengths of DNA. Prohofsky and Van Zandt predicted that 450 to 2000 base pair segments of synthetic DNA should absorb $10^3$ to $10^4$ times as strongly in the microwave region as an equivalent mass of water with a decrease in peak absorption due to water damping. The 1.7% dilution of DNA investigated by PFLOH spectroscopy in this work indicated a 40% increase in absorption above pure water at 8 GHz and at 10 to 12% increase at 12 GHz. The measured DC conductance of this DNA sample was quite low yet its absorption coefficient was still 25% higher at 8 GHz than a saline solution of 20 times greater DC conductance. We conclude therefore that the observed absorption of the DNA solution does not come from ionic behavior.

The observed absorption is suggestive of direct microwave absorption by the longitudinal acoustic mode of the double helix discussed by Prohofsky and co-workers. Based on the concentration of DNA solution which gave 40% more absorption than pure water at 8 GHz, the microwave absorption of DNA at this frequency is 24 times greater than an equivalent mass of water."

This finding that there are many orders of magnitude of increase in microwave absorption when DNA is present, may likely explain the considerable body of experimental evidence strongly indicating a relationship between long term mobile device use, and diseases involving DNA strand abnormality, such as brain cancer. As, due to the Inverse Square Law, the strength of a radio broadcast or any point source or radial field will be inverse to the square of the distance from the source, exposure levels will diminish rapidly with distance, and a device which occasions increased distance will thereby reduce signal strength absorbed by the human head.

Scientific studies [i.e., H. Lai et al, from the University of Washington, 1984, 1988, and as presented in 1998, Vienna, Austria, and 2009 in Stavanger, Norway; O. Johansson, Associate Professor, Dept. of Neuroscience of the Karolinska Institute, Stockholm, and Professor, Royal Institute of Technology, Stockholm, as presented in 2009 at Stavanger, Norway; Carl F. Blackman a founder of the Bioelectromagnetics Society, as presented in 2009, at Stavanger, Norway; Martin Blank, Ph.D., Associate Professor, Columbia University, as presented in 2009 Stavanger, Norway, Franz Adlkofer, M.D., doctorate from the Max Planck Institute for Biochemistry as presented at Stavanger Norway, 2009, also the following presenters at the International EMF Conference 2009 at Stavanger, Norway: Lukas h. Margaritis, Ph.D., Greece; Elihu D. Richter, MD, M.P.H., Israel; Alvaro Agusto A. de Salles, Ph.D., Brazil; Fredrik Soderqvist, Ph.D., Sweden, Yuri G. Grigoriev M.D. Sci., Russia; Anton V. Merkulov Ph.D., Russia] have shown potential health risks, in some instances showing DNA breakage, as associated with human exposure to non-ionizing radio wave sources, including but not limited to those emitted from mobile telephone devices and handsets, including but not limited to cellular telephones, satellite telephones, cordless telephones, and also portable computers, including those equipped with wi fi connectivity capacity. Continuing research supports that such health risks as may be associated with proximity to non-ionizing radiation will be reduced if level of exposure is reduced.

As used here, the term "non-ionizing radiation," is in reference to types and frequencies of radiation which do not have the capacity to force electron shifting at an atomic level, including with molecular effect. As used here, the term "ionizing radiation" is in reference to types and frequencies of radiation which do have the capacity to force electron shifting at an atomic level, including with molecular effect.

Current electromagnetic field generating communication devices allow the transmission of electromagnetic field though the human head, and are typically held in direct contact with the head of the user. While the SAR standards currently viewed as "safe," by the FCC rely upon an assumption that the device involved is held at an inch from the head of the user, the practical experience of the typical end user is to hold the device in direct contact with the ear. The inch presumption, however, may be different for several manufactures, but generally lies within ½ to 1¼ inches. Microwave devices, including variants of mobile and portable telephone devices broadcast electromagnetic waves, including but not limited to the radio waves which serve as conduit for the transmission of information, by modulation of amperage or frequency or varying combinations thereof. As discussed above there is competent scientific data indicating that information carrying microwave broadcast near the human body will result in DNA damage and can result in the formation of cancers. In addition, other data indicates that cellular device users with smaller skulls may receive a microwave dosage in inverse relationship to relative skull size, and that, further, the shape of the interior of the skull, including as to concavity, may have a focusing effect, potentially resulting in "hot spots" of electromagnetic signal absorption.

Some of these deleterious effects have begun to be recognized and have led to some prior art solutions. These prior art solutions however are in contrast to the solutions described in the current application in that the prior art solutions are directed to controlling the emitted signal power level of the transmitter to reduce exposure levels. These prior art solutions include:

U.S. Pat. No. 7,499,722 to McDowell et al entitled "Proximity Regulation system for Use with a Portable Cell Phone and a Method of Operation Thereof" discloses a portable cell phone including a sensor that determines the proximity of the sensor to a designated part of a user's body (including the head), and controls the transmit power level in response. Thus the transmit power level of the phone is controlled to various "allowable proximity transmit power levels" depending on the vicinity of the portable cell phone to different parts of the user's body.

U.S. Pat. No. 7,146,139 to Nevermann entitled "System and Method for Reducing SAR levels'" similarly discloses a mobile communications device having a sensor assembly for detecting proximity to a human body and a controller to reduce the average power level of the communication device to less than a predetermined acceptable level. Nevermann discloses that in some embodiments, the power level may be reduced only to the point necessary to maintain adequate signal strength, while in other embodiments the power level may be reduced as required regardless of signal strength in which case a communications link may be dropped.

U.S. Pat. No. 6,934,515 to Wallach entitled "Electromagnetic Radiation Alerting Device for Use With a Cellular Telephone" discloses a phone that is operable in different modes selected by the user (such as "near", "normal" and "far" that are calibrated for different distances of the user's head from the antenna), a RF sampling unit for measuring the EMF generated by the cell phone's antenna during its active transmission times and an alerting unit (audio, buzzer, visual) that alerts the user when a predetermined radiation level is exceeded for the selected mode of operation.

U.S. Pat. No. 6,456,856 entitled "Mobile Radio Equipment forming Antenna Pattern to Protect User From Radiation". This reference discloses a proximity detection device for measuring humidity or temperature and to detect the presence of human tissue in the vicinity of the device and to adjust transmit power in a directional antenna as a function of the data produced by the detector.

The prior art however fails to recognize that providing information to the user in the form of a warning or other alert may be beneficial in maintaining a minimum distance between the user and the mobile device. Without manifestly causing a change in the habits or manner of use of the mobile devices by the user, the prior art approach fails to adequately address the problem.

In order to address the detrimental effects described above and obviate the deficiencies of the prior art, the present subject matter discloses controlling the distance between the user, specifically the head, and the mobile device to a minimum distance to therefore reduce exposure. The advantageous reduction in exposure is realized due to the operation of the Inverse Square Rule on electromagnetic signal from cellular and other radio devices, in that there is a steep fall off of signal strength resultant from increased distance between the head of the user and the source of the signal, as a class, devices which result in increased operational distance between the user and the broadcast device will result in a diminution of signal absorption which, while situational variable, can be dramatic in practical effect. As described herein, the disclosed embodiment control the distance between the emitting devices and the user by influencing the user to maintain a minimum distance via alerts, interruptions and warnings.

These and many other advantages of the present subject matter will be readily apparent to one skilled in the art to which the invention pertains from a perusal of the claims, the appended drawings, and the following detailed description of preferred embodiments.

DETAILED DESCRIPTION

Embodiments of devices and methods described herein reduce end user exposure to radiation. While these devices and methods are intended for protection from non-ionizing radiation, such as that emitted from cellular telephones, each embodiment and illustration may also be practiced with regard to ionizing radiation.

As to the handheld radio communication devices, embodiments discloses serve to reduce human user electromagnetic wave exposure from such devices through the strong encouragement of increased distance between the radio-wave source and the head of the user. Mobile devices incorporating the disclosed subject matter forcing the end user to keep the antenna of the device at least an inch from the head, or a greater distance if desired will not only be compliance with the SAR standards which apply to such devices, which standards are routinely violated by end-user proximity to the device while it is in use, but will as a result of the increase in distance between the broadcast source and the head, significantly reduce the level of microwave signal strength to which the end user would otherwise be exposed from the mobile device.

A disclosed embodiment works by integrating a sound broadcast device, hereafter sometimes referred to as sonar, which, when distance between the device and the head of the user is detected by sound signal return measurement, through the resulting closing or virtual rheostat variance in the performance of a switch, causes an audible warning sound, the intensity of which bears an inverse relationship to the distance between the cellular device involved and the head of the end user. In addition, the embodiment may be tuned such that in the instance of a time-measured proximity within assigned distance values, the Device response to such sound-measured proximity allow the completion or interruption of the circuits necessary for the handheld device transmission and reception signal.

Figure 1:
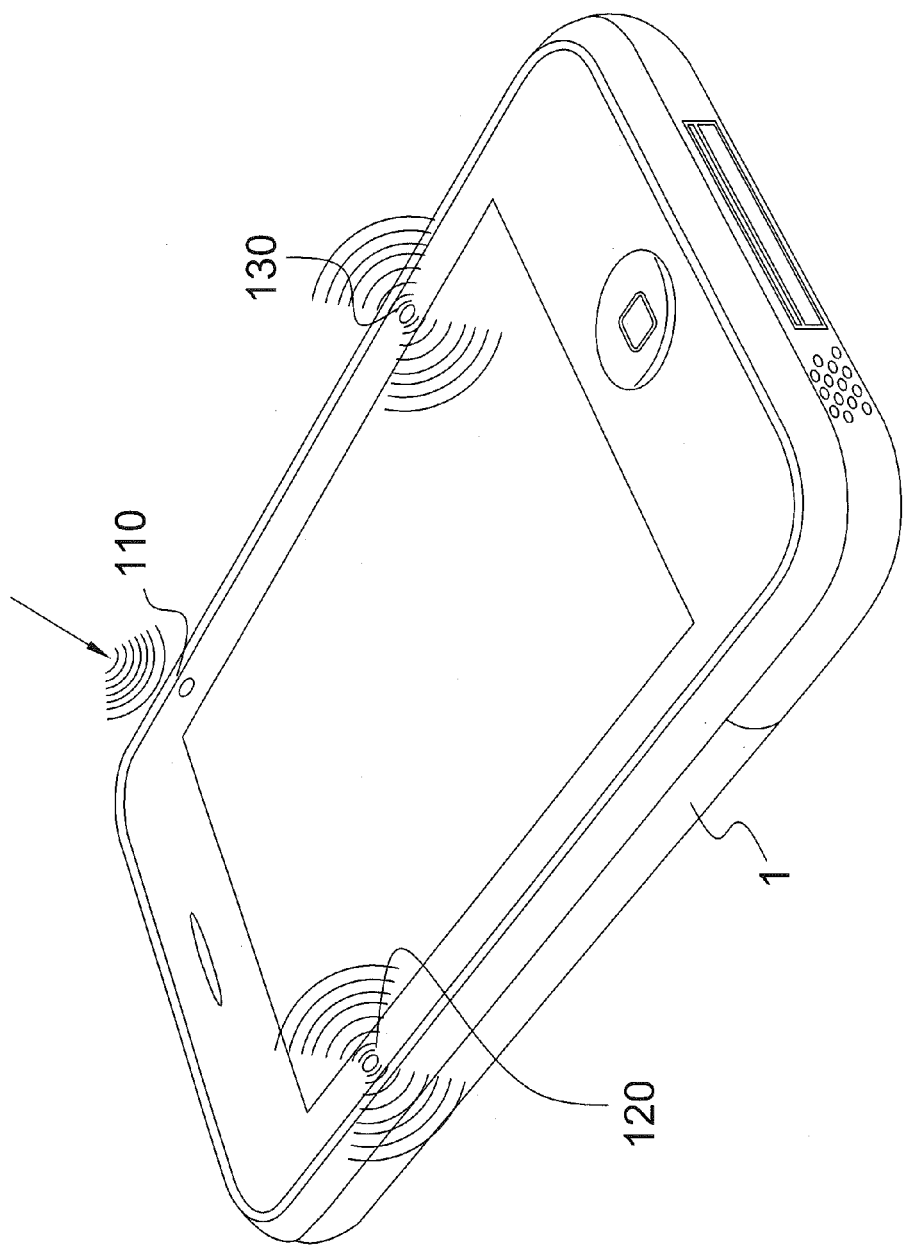
FIG. 1 illustrates an embodiment of a Sonic Switch Activation Distance Warning Device and Method.

FIG. 1 shows an embodiment of a mobile device utilizing a non audible sound wave (Sonar, Sonic) to determine the distance and thus issue a warning to the user. As shown the mobile device 1 includes a sonic signal broadcast source (transmitter) 120, and a sonic signal recipient microphone device (receiver) 110 and an acoustic warning device (speaker) 130. The warning device while shown as acoustic in FIG. 1, may also be visual, thermal, tactile or electrical and its depiction throughout the disclosure as one type is not intended to be exclusive. The warning signal may be emitted in increasing volume (intensity) and/or variation in sound frequency (tone), so as to cause a progressive proximity warning to the end-user and at higher transmit power levels actually interfere with the effective use of the device for communication. As a result of increase in intensity of the sonic signal return 105, the forced switching of the device, with respect to its broadcast ability, to the "off" condition, may be desirable. In addition a time circuit 140 on FIG. 2 can be used so as to allow short term override of the warning or interruption, or to set time-based standards for warning signal initiation. All implementations of switches, including micro-switches, which may be employed to cause open or closed circuits for initiation of an information transmission signal (Warning Signal) in a mobile device, when the default condition, or as such switches may be used to vary the intensity of sonic warning signal issued.

Figure 2:
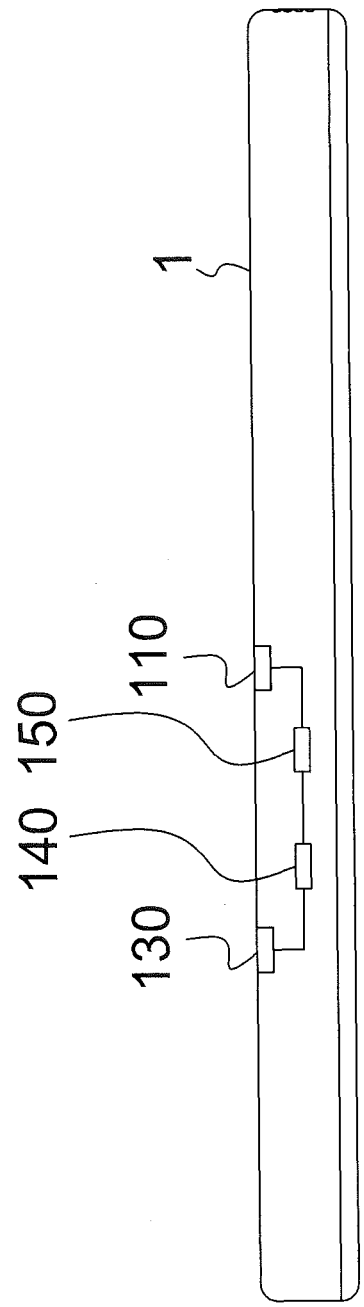
FIG. 2 illustrates a schematic of an embodiment of the sonic switch activation warning device.

FIG. 2 shows the embodiment of FIG. 1 from the side view The calibrated acoustic broadcast signal from mobile device 1 equipped for radio broadcast, is so tuned that the discrete sound frequency, when reflected back from the body of the end-user and measured by the mobile device, will cause the recognition by the integrated device of the meeting of such proximity standards as the manufacturer may choose to employ so as in, by resulting warning as described herein and below so as to cause the end user to maintain desired distance from the subject handheld cellular device. The broadcast signal is received by the sonic signal reception device 110. A voice chip or similar module 150 may be used to analyze the received reflected signal. The Adjustable and controllable time circuit 140 may be used for time out, overrides and adjustment of warning signal intensity or frequency as emitted by the acoustic warning device 130. The voice chip, or time circuit may take the form of a micro processor, a ASIC, or resident processor running application software or any combination thereof. The sound-activated switch as in this paragraph described (for which voice recognition chip and hardware at the current state of the art are well-suited) may cause the recognition by the integrated switching device of the meeting of such proximity standards as the manufacturer may choose to employ so as in, by resulting Warning as described herein and below so as to cause the end user to maintain desired distance from the subject handheld cellular device.

The addition of an increasing audible audio signal, increasing in inverse proportion to the distance from the cellular or similar device to the head or body of the end user, such that such increased audio signal shall constitute a warning to the end user of such decreased distance between the end user and said cellular or other radio broadcast device, so that said end user shall be thereby warned to increase the distance between the head of the end user and such cellular device until the audible warning from such cellular device (having integrated the Device and Method herein described) shall stop the audible broadcast of such Warning signal.

As noted throughout this specification, the emitted and received waves may be electromagnetic in nature and the warning signal also is not limited to the acoustic forms illustrated in FIGS. 1 and 2.

While illustrations may include reference to a separate speaker system for the warning process, and while such separate speaker system may be a desired optional approach for a given manufacturer, the mobile device ear piece resident for audio communication can be optionally used for the broadcast of the intermittent calibrated acoustic signal, thereby eliminating the need for a separate speaker for that purpose, the ear piece or standard speaker may also be used to provide an audible warning rather than a separate warning device. Likewise the mobile device mouth piece resident for audio communication may also be used for the reception of the acoustic signal thus eliminating the need for a separate receiver.

Embodiments in which sound waves used to detect proximity may include sound frequencies within the audible range, but preferable maybe of such high frequency as not to be detectable by the typical human ear and thus not noticeably interfere with the desired communication.

Embodiments may also include intermittent broadcast of the calibrated sonic signal which, when reflected back, actuates portions of the mobile device, so that such brief sonic signal broadcast may be, when the mobile device is not in use, set to occur with such rarity or commonality as the manufacturer may desire, and including the possibility for end user adjustment of such regularity level of such broadcast should any such manufacturer wish to allow such limitation.

The warning signal or alert as described herein may be graduated in intensity so that, much like the graduated sound intensity capacity of common alarm clocks, the level of warning may increase with time of use of the mobile device and or with the measured proximity to the head of the end user.

Embodiments described herein may additionally be actuated by the angle of the mobile device or angle of incident. By this is meant an angular position measurement switch such as of the sort used in currently marketed battery operated equipment which have automatic angular recognition, such as with the auto on/off function of the certain Bushnell equipment such as the 1×28 Red Dot Sight with auto on/off. Thus, when flat on a table, or within such other angular positions as the manufacturer may elect, the Method and Device may default to the off condition.

In addition the embodiments described herein may be implemented, via either electrical circuit or via software, so that the disclosed subject matter deployed will not interrupt broadcast and receipt of messages or voice whenever either the "speakerphone" or similarly named "speaker," aspect of the mobile device is engaged, or a headset is in use and thus the risk of exposure is greatly depreciated.

Embodiments of the disclosed subject matter may be implemented by integrating a sound broadcast device, hereafter sometimes referred to as sonar, which, when distance between the device and the head of the user is detected by sound signal return measurement, through the resulting closing or virtual rheostat variance in the performance of a switch, causes an audible warning sound, the intensity of which bears an inverse relationship to the distance between the cellular device involved and the head of the end user. In addition, the method and device can be so tuned at manufacture such that in the instance of a time-measured proximity within assigned distance values, the embodiment in response to such sound-measured proximity can in turn allow the completion or interruption of the circuits necessary for the handheld device broadcast and receive microwave signal.

Figure 3:
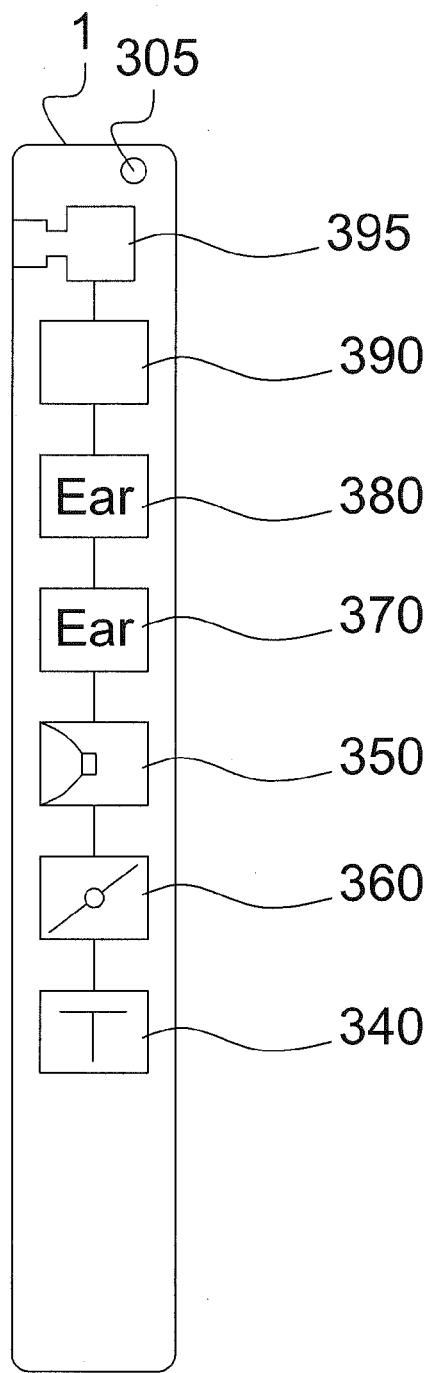
FIG. 3 shows an embodiment utilizing depth of field and pattern Recognition Based Proximity Warning.

FIG. 3 shows the depth of field and pattern recognition based proximity warning system enabled in a mobile device 1. The embodiment as illustrated in FIG. 3 includes a horizon sensing device 305, which may include but not limited to the use of accelerometer circuitry for determining an angular range within the vertical axis of the mobile telephonic or similar device, so as to encompass all angles consistent with direct handset to ear orientation for speech, which activates, or increases frequency of proximity detection and exposure determining processes. The mobile device includes intermittent broadcast "active" auto focus (typically infrared) module for broadcast, receipt, and processing of light data (so thereby to define a distance), and determining when a distance within predetermined parameters is reached. The embodiment also includes CMOS 395 or similar module light recipient device, which captures images at the depth of field range assigned by the auto-focus module, the image may then be processed by the image processor 390 and the pattern recognition programmed chip 380, where a search is conducted in a processor 370 for images consistent with aspects/characteristic of the human head, such as an "ear," (and which may, as a condition of sale, include an initial photograph of the ear of the end user) or other characteristics, so that when there is a coincidence of factors including a set distance from "ear," or other feature within programmed parameter (such as 1.25 inches) the warning signal is emitted from an indicator 350, which if audio is in increasing volume and/or variation in sound frequency, so as to cause a proximity warning to the end-user and if the transmission levels are sufficiently high cause interfere with the use of the device for sound transmission. The result of an increase in intensity of the sonic signal return, forces the switch 360 of the device, as to broadcast, to the "off" condition. In addition a timer circuit 340 can be used so as to allow short term or temporary override of the switch, or to set time-based standards for warning signal initiation. Each of the elements described in FIG. 3 may be implemented in processes and hardware resident on the mobile device 1 with only additional programming required.

The use of an active light signal to determine the distance may include but not limited to infrared, a laser, or other signal in the electromagnetic spectrum which may facilitate measuring the distance between the head of the end user and the cellular or similar device in which the described embodiment has been implemented. The use of light signal to measure distance from the head in the cellular telephonic and other radio wave broadcast contexts.

The receipt and chip-based processing of active light signal by CMOS 395 or similar means, or by photovoltaic structure, and including but not limited to any suitably programmed variant for the purpose of measuring the distance between the head of the end user and the mobile device.

The image recognition modules 390, 380 and 370 for the storing and retrieval of images, or aspects or characteristics of the user, may incorporate but are not limited to the pre-programmed image, taken at time of purchase, of the first purchasing end user, and as well as catalogs of images corresponding to the characteristics of the user such as the human ear, so that, through the use of the camera in company with such stored imagery and the processing of such imagery, the disclosed subject matter may recognize the human ear or other desired features, so that such recognition, at distances from head programmed as desired may be used to activate the warning signal or to interrupt cellular broadcast in such instances that the distance between the end user and the cellular headset user become within parameters defined as favorable by the manufacturer involved, all for the protection of the user from micro-wave or other wavelengths of radio signal, the strength of which declines rapidly over distance due to the operation of the inverse square law as previously discussed.

The proximity to the user may be determined by processing the image to determine the relative size of the features captured in the image with respect to the characteristics of those images as stored. Determining whether to provide an alert may also be based on a proximity from the user coupled with an analysis of the image. Such that if the image were to identify a table top such as the mobile device being placed face down, the actual proximity to that table would be irrelevant since the user would likely not be at risk for exposure, however if the minimum proximity has been breached and the image identifies a users ear, a warning would advantageously be initiated.

The angular detection and thus management of the embodiments described herein may be by the use of accelerometers, electronic level circuitry (such as found variously, but in example in the Bushnell ×28 Trophy rifle scope, with its "auto on/off system) such that the intermittent broadcast of distance measuring light or other measurement electromagnetic signal may initiated only when a cellular handset or similar device falls within planes of the vertical corresponding to cellular telephone use for broadcast.

The use of resident auto-focus image acquisition chip equipment and circuitry with a mobile device or similar device, where a micro-processor is used to define a focus level, through comparison with an electronically stored database of suitable physical characteristics/aspects of the user such that through encounter of a predefined image sharpness level, corresponding to a desired and programmed depth of field, so that a range of distance may be determined to be within desired parameters for the initiation of a warning signal to the end user. If desired a time-in-contact parameter may also be incorporated, such that when a desired level of proximity to the head is encountered, such warning or broadcast signal interruption occurs to be within a safe limit.

The use of a simple fixed depth of field camera device, such as a CMOS module, but including all manner of lens, such that when a particular mixture of colors (such as corresponding to ranges of human head coloration near the ear), or when a particular level of shadings (such as corresponding to ranges of human head coloration near the ear) is encountered (recognized) by said image obtainment device, and a switch or series of microprocessor switches is there, by such image recognition at such passive depth of field so activated, that an audible warning thereby does arise, and, in the instance of prolonged exposure beyond such passively set depth of field, or within two or more such programmed depths of field as a range, broadcast signal may be thereby interrupted, thereby reducing the exposure of the end user of a cellular or similar device to micro-wave or other wave lengths of radio broadcast signal.

The implementation of current of switches, including micro-switches, which may be employed to cause circuitry closure for initiation of a information transmission signal in a mobile device or similar device, when the default condition, or as such switches may be used to vary the intensity of sonic warning signal issued by the installed Device and Method as set forth herein, or as otherwise used for audible signal issuance or broadcast signal cessation in response to defined proximity between user and handset.

In embodiment utilizing light transmissions the frequency of such light broadcast may be so tuned that the discrete frequency, when reflected back from the body of the end-user and measured by the mobile device, will cause the recognition, via CMOS and chipset, so programmed for such purpose, of the meeting the manufacturers proximity standards and thus result in a warning as described herein and below so as to cause the end user to maintain desired distance from the subject handheld mobile device.

As described above, the use of an increasing intensity warning signal may be advantageous. The warning signal increasing in inverse proportion to the distance from the cellular or similar device to the head or body of the end user, such that such increased signal shall constitute a Warning to the end user of such decreased distance between the end user and the mobile device. The increasing intensity also relays to the user a degree of relativity regarding their risk of exposure. The end user shall be thereby warned to increase the distance between the head of the end user and such cellular device until the warning from the mobile device preferable stops or at least diminishes. The intensity of the warning signal as noted may be an increase in volume, an increase or decrease in frequency, or an interruption.

While illustrations herein may include reference to a separate speaker system for the warning process, and while such separate speaker system may be a desired approach to implement the disclosed subject matter, the embodiments disclosed may alternatively make use of the "standard" speaker (ear piece) with which mobile devices are otherwise normally equipped, sans the Method and Device as hereby described. In plain language, the standard speaker can be optionally used for the broadcast of the intermittent calibrated acoustic signal, thereby eliminating the need for a separate speaker for that purpose.

The disclosed subject matter includes an exemplary embodiment for maintaining a distance between a user and a device emitting radio waves. The programming disclosed is operable in an Apple I Phone, similar programming is envisioned in other operating systems and products.

Proximity Warning Software For Cellular Telephone Application

Attachment to May 5, 2010 Provisional Patent Application of Harry V. Lehmann - Inventor - Copyright April 18, 2010, Harry V. Lehmann, All Rights Reserved The following programming steps will result in the programing of an Apple iPhone such that, when the device comes within one inch of the flesh of the end user, and resides in such proximity for an adjustable period of time, an alarm sounds, warning the end user of the proximity of the cellular telephone, or other radio device, to his or her head.

```
//
//  main.m
//
// Under a Confidentiality and Non-Circumvention Agreement
// with Harry V. Lehmann, Inventor, and drafted to his
// specifications in prior filed Art, this software was
// engineered by P. Mark Anderson on 4/18/10.

import <UIKit/UIKit.h> int main(int argc, char *argv[])
{
    NSAutoreleasePool *pool = [[NSAutoreleasePool alloc] init];

int retVal = UIApplicationMain(argc, argv,
        @"ProximityWarningApp",
        @"ProximityWarningAppDelegate");

[pool release];
    return retVal;
}

//
// Constants.h
// define PROXIMITY_STATE_CHANGE @"PROXIMITY_STATE_CHANGE"
define PROXIMITY_STATE_KEY @"PROXIMITY_STATE_KEY"
```

```
//
//  ProxApp.h
// import <UIKit/UIKit.h>

@interface ProximityWarningApp : UIApplication
{
}

@end

//
//  ProxApp.m
// import "ProximityWarningApp.h"
import "Constants.h"

@implementation ProximityWarningApp

- (void) proximityStateChanged:(BOOL)state
{
    NSDictionary *userInfo = [NSDictionary
        dictionaryWithObject:[NSNumber numberWithBool:state]
        forKey:PROXIMITY_STATE_KEY];

[[NSNotificationCenter defaultCenter]
        postNotificationName:PROXIMITY_STATE_CHANGE object:nil
        userInfo:userInfo];
}

@end

//
//  ProximityWarningAppDelegate.h
// import <UIKit/UIKit.h>

@class MainViewController;

@interface ProximityWarningAppDelegate : NSObject
```

```
<UIApplicationDelegate>
{
    UIWindow *window;
    MainViewController *mainViewController;
}

@property (nonatomic, retain) IBOutlet UIWindow *window;
@property (nonatomic, retain) MainViewController *mainViewController @end //
//  ProximityWarningAppDelegate.m
// import "ProximityWarningAppDelegate.h"
import "MainViewController.h"
import "Constants.h"

@implementation ProximityWarningAppDelegate

@synthesize window;
@synthesize mainViewController;

- (BOOL)application:(UIApplication *)application
        didFinishLaunchingWithOptions:(NSDictionary *)launchOptions
{
    MainViewController *aController = [[MainViewController alloc]
            initWithNibName:@"MainView" bundle:nil];
    self.mainViewController = aController;
    [aController release];

mainViewController.view.frame =
            [UIScreen mainScreen].applicationFrame;
    [window addSubview:[mainViewController view]];
    [window makeKeyAndVisible];

[UIDevice currentDevice].proximityMonitoringEnabled = YES;

return YES;
}
```

```
- (void)dealloc
{
    [mainViewController release];
    [window release];
    [super dealloc];
}

@end

//
//  MainViewController.h
// import "FlipsideViewController.h"
include <AudioToolbox/AudioToolbox.h>

@interface MainViewController : UIViewController
<FlipsideViewControllerDelegate>
{
    SystemSoundID chirp;
    SystemSoundID alarm;
    NSTimeInterval timeIntervalBetweenWarningSignals;
    NSDate *previousWarningTimestamp;
    NSTimer *intensityTimer;
    CGFloat warningIntensity;
    CGFloat timeInState;
    CGFloat intensity;
}

@property (nonatomic, retain) NSTimer *intensityTimer;
@property (nonatomic, retain) NSDate *previousWarningTimestamp;

- (IBAction) showInfo;

@end

//
//  MainViewController.m
// import "MainViewController.h"
import "Constants.h"

typedef enum
{
```

```
    WarningTypeChirp,
    WarningTypeVibrate,
    WarningTypeVisual,
    WarningTypeTone,
    WarningTypeAlarm
} WarningType;

#define SELECTED_WARNING_TYPE WarningTypeAlarm
define WARNING_IS_REPETITIVE YES define APP_DELEGATE ((ProxAppNewAppDelegate*)[[UIApplication sharedApplication] delegate])

define AUTOMATICALLY_RESET_INTENSITY YES define INTENSITY_TIMER_INTERVAL 0.1
define TIME_INTERVAL_DELAY_UNTIL_WARNING_BEGINS 1.0
define TIME_INTERVAL_UNTIL_MAX_INTENSITY 10.0 define MINIMUM_TIME_INTERVAL_BETWEEN_WARNINGS 0.2
define MAXIMUM_TIME_INTERVAL_BETWEEN_WARNINGS 3.0 define MINIMUM_WARNING_TONE_PITCH_HZ 4000
define MAXIMUM_WARNING_TONE_PITCH_HZ 17000 define MINIMUM_WARNING_VOLUME_DECIBLES 0
define MAXIMUM_WARNING_VOLUME_DECIBLES 100

@implementation MainViewController

@synthesize intensityTimer;
@synthesize previousWarningTimestamp;

- (void) dealloc
{
    [intensityTimer release];
    [previousWarningTimestamp release];
    [super dealloc];
}

- (id) initWithNibName:(NSString *)nibNameOrNil
    bundle:(NSBundle *)nibBundleOrNil
{
    if ((self = [super initWithNibName:nibNameOrNil
            bundle:nibBundleOrNil]))
```

```
    {
        NSURL *chirpSoundURL = [NSURL fileURLWithPath:
            [[NSBundle mainBundle] pathForResource:
                @"focus1" ofType:@"aif"]];

OSStatus status = AudioServicesCreateSystemSoundID(
            (CFURLRef)chirpSoundURL, &chirp);

NSURL *alarmSoundURL = [NSURL fileURLWithPath:
            [[NSBundle mainBundle] pathForResource:
                @"klaxon" ofType:@"aiff"]];
        status = AudioServicesCreateSystemSoundID(
            (CFURLRef)alarmSoundURL, &alarm);

[[NSNotificationCenter defaultCenter]
            addObserver:self
            selector:@selector(proximityStateChanged:)
            name:PROXIMITY_STATE_CHANGE object:nil];
    } return self;
}

- (void) proximityStateChanged:(NSNotification*)notif
{
    NSDictionary *userInfo = notif.userInfo;
    BOOL state = [(NSNumber*)[userInfo
            objectForKey:PROXIMITY_STATE_KEY] boolValue];

if (state)
    {
        if (AUTOMATICALLY_RESET_INTENSITY)
            timeInState = 0;

self.previousWarningTimestamp = nil;
        self.intensityTimer = [NSTimer
            scheduledTimerWithTimeInterval:
                    INTENSITY_TIMER_INTERVAL
            target:self
            selector:@selector(updateWarningIntensity)
            userInfo:nil
            repeats:YES];
    }
```

```
        else
        {
            [intensityTimer invalidate];
        }
}

- (void) computeWarningIntensity
{
    if (timeInState > TIME_INTERVAL_UNTIL_MAX_INTENSITY)
    {
        intensity = 1.0;
    }
    else if (timeInState < TIME_INTERVAL_DELAY_UNTIL_WARNING_BEGINS)
    {
        intensity = 0.0;
    }
    else
    {
        intensity = (timeInState /
            TIME_INTERVAL_UNTIL_MAX_INTENSITY);
    }
}

- (void) computeTimeIntervalBetweenWarningSignals
{
    NSTimeInterval totalTimeSpan =
            MAXIMUM_TIME_INTERVAL_BETWEEN_WARNINGS -
            MINIMUM_TIME_INTERVAL_BETWEEN_WARNINGS;

timeIntervalBetweenWarningSignals =
            ((1.0 - intensity) * totalTimeSpan) +
            MINIMUM_TIME_INTERVAL_BETWEEN_WARNINGS;
}

- (void) emitChirp
{
    AudioServicesPlayAlertSound(chirp);
}

- (void) vibrate
{
    AudioServicesPlayAlertSound(kSystemSoundID_Vibrate);
}

- (void) displayVisualWarning
```

```objc
{
    // Flash the screen color.
    if (self.view.backgroundColor != [UIColor whiteColor])
        self.view.backgroundColor = [UIColor whiteColor];
    else
        self.view.backgroundColor = [UIColor blackColor];
}

- (void) emitTone
{
    // TODO: Generate a tone
}

- (void) playAlarmSound
{
    // TODO: Do not play alarm sound if
    // the previous alarm is still playing.
    AudioServicesPlayAlertSound(alarm);
}

- (BOOL) notReadyForNextWarningSignal
{
    if (previousWarningTimestamp == nil)
    {
        // This is the first warning.
        return NO;
    }

NSTimeInterval timeIntervalSinceLastWarning =
        -[previousWarningTimestamp timeIntervalSinceNow];

if (timeIntervalSinceLastWarning <
        timeIntervalBetweenWarningSignals)
    {
        // Not enough time has elapsed yet since the last warning.
        return YES;
    }
    else
    {
        // Ready for next warning.
        return NO;
    }
}

// If enough time has elapsed since the previous
```

```
// warning signal occured, execute the
// selected warning type.
- (void) executeWarningSignal
{
    if (WARNING_IS_REPETITIVE &&
         [self notReadyForNextWarningSignal])
    {
        return;
    } switch (SELECTED_WARNING_TYPE)
    {
        case WarningTypeChirp:
            [self emitChirp];
            break;

case WarningTypeVibrate:
            [self vibrate];
            break;

case WarningTypeVisual:
            [self displayVisualWarning];
            break;

case WarningTypeTone:
            [self emitTone];
            break;

case WarningTypeAlarm:
            [self playAlarmSound];
            break;
    } self.previousWarningTimestamp = [NSDate date];
}

- (void) updateWarningIntensity
{
    timeInState += INTENSITY_TIMER_INTERVAL;

[self computeWarningIntensity];
    [self computeTimeIntervalBetweenWarningSignals];

if (intensity > 0)
```

```
        {
            [self executeWarningSignal];
        }
}

@end
```

Figure 4:
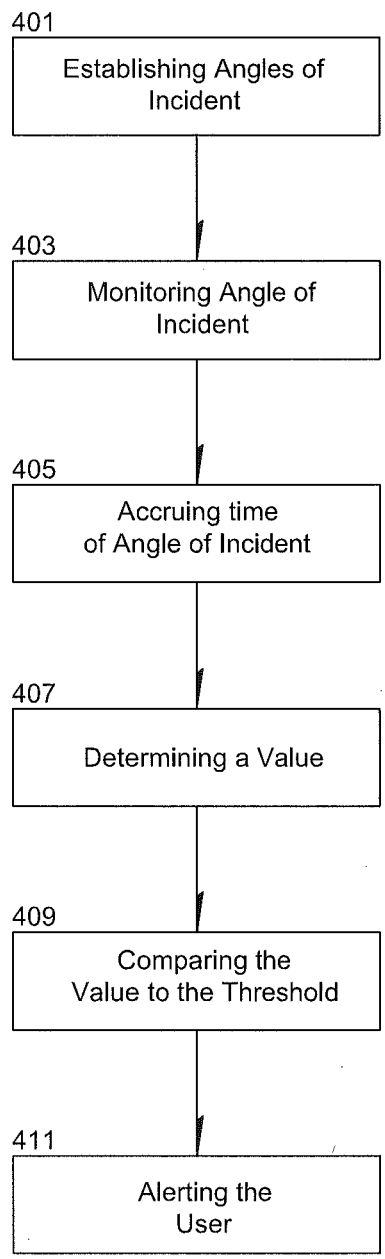
FIG. 4 is a flow chart of an embodiment in which the angle of incident is used to determine use of the mobile device and thus radiation exposure.

FIG. 4 is a flow chart of an embodiment in which the angle of incident is used to determine use of the mobile device and thus radiation exposure. As shown in Block 401 angles of incident are established that corresponding with its use by the user for communication. These angles of incident or ranges of angles may be determined by a control period in which the angles of incident are compiled and associated with the mobile device status, such as associated with active communication session or with no communication sessions, this association may be determined manually or autonomous. The angles of incident may then be statistically processed to determine the likely range of angles that would indicate the mobile device is in use by the user. For example if over a control period 70 percent of the time when the phone is within 10 degrees of perpendicular from the horizon it is in use and over the same control period only 2 percent of the time when the phone is greater than 10 degrees from horizontal it is in use, a statistical analysis may establish the target angle of incidences being between + or −10 from horizontal. Similarly, if over the control period the mobile device is never engaged in a communication session when within 10 degrees of horizontal the established angles of incident may be 10 to 170 degrees.

Once the angles of incident are established the mobile device monitors the angle of incident for correspondences with the established angles as shown in Block 403. The time during which the mobile device is at an angle corresponding to the established angles of incident is accrued as shown in Block 405, likewise the corresponding magnitude of the transmission power may also be factored in the accrual. Using the accrued time and a transmit power level of the mobile device, a value representing the total exposure of the user may be determined as shown in Block 407. The transmit power level of the mobile device may be a predetermined value, a peak value, a statistical measurement of the power level over the accrued time, such as an average, or some weighted value based on the actual operation of the mobile device.

The exposure value may then be compared to a predetermined threshold as shown in Block 409. The predetermined threshold may be a function of established safe exposure limit, peak transmit power levels of the mobile device, sensitivity of the user, such as age, size, or mobile phone use patterns etc. Similarly the threshold may also consider communication performance measures, recognizing that in sparse areas transmission power levels may necessarily be greater than those in urban areas for the same level of performance. Thus the exposure threshold for rural users may be necessarily higher than urban users. The threshold may also be representative of several thresholds, such as a session exposure limit, a daily exposure limit or weekly limit. If any of these thresholds are exceeded by the value the mobile device alerts the user as shown in Block 411. The process of monitoring the angles for use, accruing the time of use, determining a value and comparing the value to a threshold as described in Block 403, 405, 407, and 409 respectively may be continuously preformed or preformed periodically or as triggered.

As noted previously there are several mechanisms and methods by which the angle of incident of the mobile device may be determined which are commonly resident on some current mobile devices. Accelerometers, inclinometer, strain gauges, magnetometers, gyroscopes, GPS receivers and inertial systems and other transducer/processor combinations are envisioned as being appropriate for this function.

Figure 5:
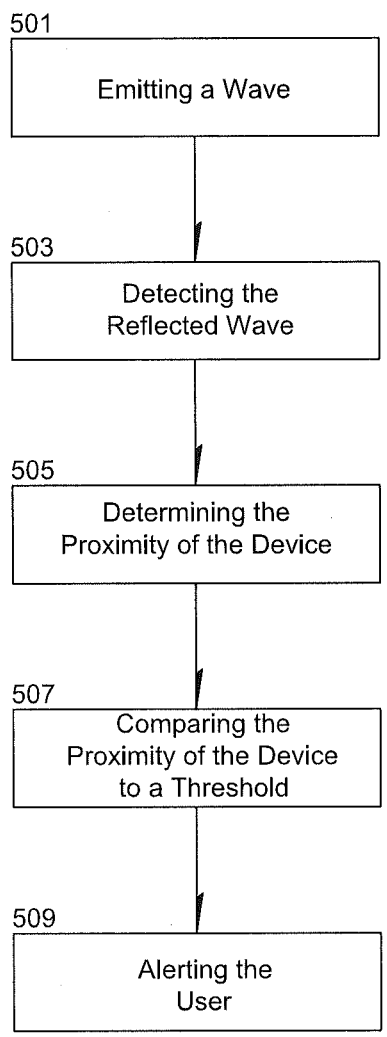
FIG. 5 illustrates an embodiment for preventing excessive exposure of a user from a mobile device during communication where the mobile device actively determines the proximity of the mobile device to the user

FIG. 5 illustrates an embodiment for preventing excessive exposure of a user from a mobile device during communication where the mobile device actively determines the proximity of the mobile device to the user. In this embodiment the mobile device is equipped with a wave source, and reflected wave receives, such as source 120 and received 110 of FIG. 1.

In order to determine the proximity of the mobile device to the user, the device emits a wave from the source as shown in Block 501. As noted previously, the wave need not be limited to a sound or pressure wave, but can equally be an electromagnetic wave within or outside of the visible light spectrum and methods and systems described with respect to audio, sonic or audible signals are equally envisioned as electromagnetic waves. The mobile device also equipped with a received detect a reflection of the emitted wave as shown in Block 503. Based on the characteristics of the reflected wave, the proximity of the mobile device to the user, particularly the user's head region, is determined as shown in Block 505. The characteristics of the reflected wave may include time of reception (or time of arrival), phase, frequency, time, or attenuation. Given these characteristics and the known characteristics of the emitted wave the proximity may be determined. As noted previously, several waves of the same or varying characteristics may make up the emitted and reflected wave, and each may be analyzed, separately or combined to determine the proximity.

The mobile device then compares the determined proximity to a threshold as shown in Block 507. The threshold like those discusses with respect to other embodiments is a function of the transmit power level (average, peak, normal) of the mobile device and safe exposure levels. The threshold may also include user sensitivity, and accrued exposure. However, with respect to this embodiment it is the instantaneous exposure that is sought to be maintained below an unacceptable limit. This instantaneous exposure limit may however be influenced and advantageously adjusted as a function of accrued exposure and other factors as discussed above. If the comparison reveals the threshold has been exceeded, i.e. the minimum distance between the user and the mobile device has not been maintained, the user is alerted as shown in Block 509.

Figure 6:
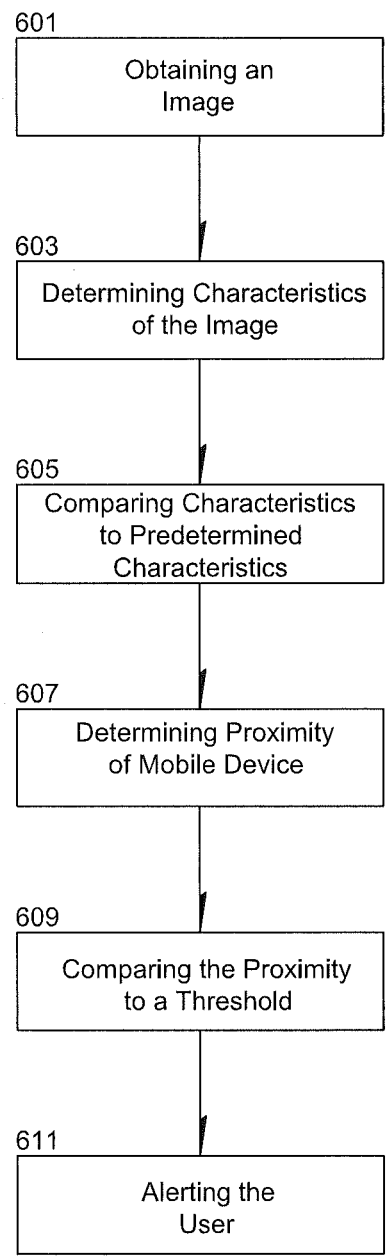
FIG. 6 is an embodiment for preventing excessive exposure of a user from a mobile device during communication

FIG. 6 is an embodiment for preventing excessive exposure of a user from a mobile device during communication. An image is obtained by the mobile device as shown in Block 601. The obtained image is in the proximity of the speaker of the mobile device oriented such that when in use would be adjacent to the users head. This image may be obtained with the aid of auto focus features often implemented in digital cameras and some mobile devices. The image is then evaluated for characteristics of the user as shown in Block 603. The evaluation may advantageously be performed using the image processor 390, pattern recognition software and chip 380 and processor 370 previously described with respect to FIG. 3. The determined characteristics may then be compared to known characteristics as shown in Block 605.

The mobile device may use the comparison of the characteristics to determine a proximity of the mobile device to the users head or specifically the user's ear as shown in Block 607. Alternatively, the proximity may be determined as a function of an emitted wave as described above, or as a function of an resident auto focus feature as described herein. The determined proximity is then compared to a predetermined threshold as shown in Block 609. The threshold may be determined similarly to the thresholds previously discussed. If the threshold is exceeded, i.e. the minimum distance has been breached, the mobile device may alert the user as shown in Block 611. If the image capture is not of the user or not of a recognized portion of the user, the proximity may not be further determined since there would be limited exposure to the radiation.

Figure 7:
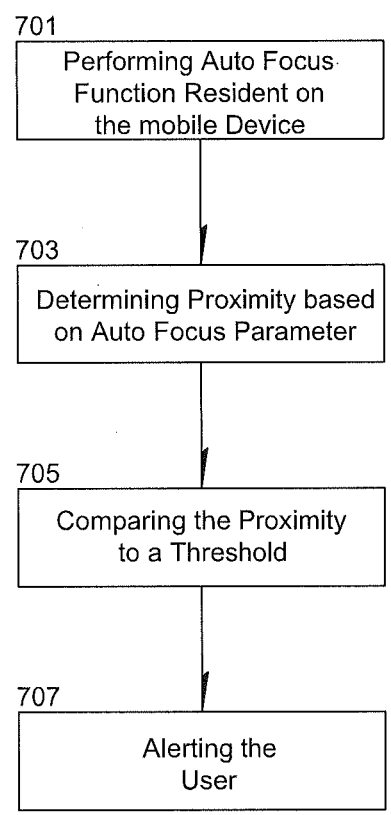
FIG. 7 is an embodiment directly utilizing parameters of auto focus for proximity detection.

Alternatively, as shown in FIG. 7, for mobile devices with auto focus software, the mobile device may use parameters associated with the auto focus as shown in Block 701 to directly determine the proximity of the mobile devices to an object as shown in Block 703. Having the proximity, the mobile device may then compare this proximity to a threshold as shown in Block 705, and if the threshold is exceeded then the user may be alerted as shown in Block 707.

Figure 8A:
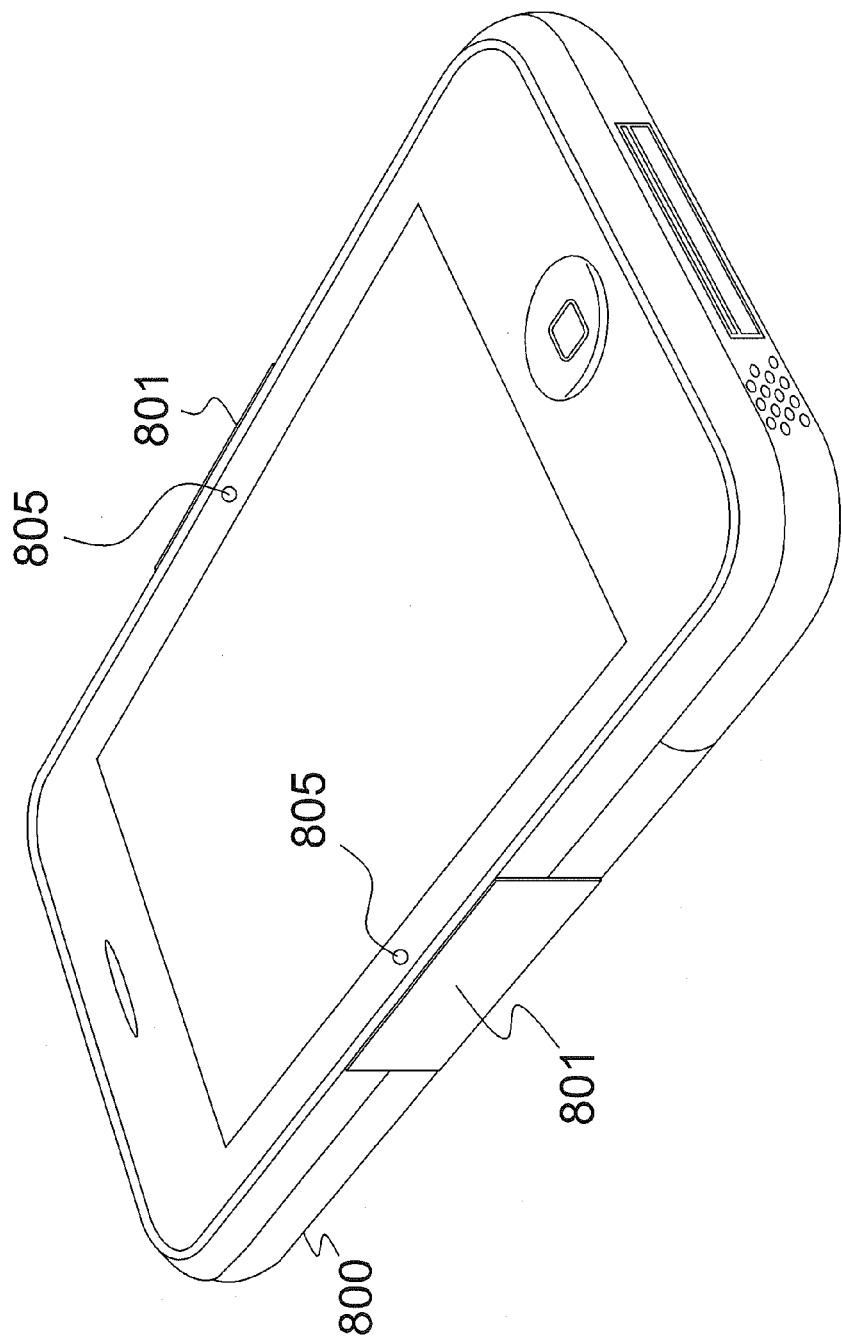
FIG. 8a-8e show an embodiment of the subject matter with physical separating devices enforcing the minimum distance.

Other embodiments of the disclosed subject matter make use of physical barriers to maintain the minimum distance by the integration and deployment of a hinged fold-away plate with a switch which allows the completion of the circuits necessary for the mobile device to broadcast and receive radio signals. FIGS. 8a-8e are illustrations of a mobile device with a fold over switch. FIG. 8a shows a mobile device 800 implementing a fold over physical barrier (flange) 801 in a stowed and locked condition. For purposes of illustration, a switch 805 is located such that when the barrier 801 is folded forward on its hinge, and locked into the position via a friction latch or other appropriate locking mechanism, the switch 805 is automatically activated by being depressed by the folding flange 801 when it is deployed and the mobile device is allowed to broadcast. Conversely, until the switch is activated by the deployment of the hinged flange or plate 801 some broadcast functions are disabled thus preventing exposure from the mobile devices radiation as shown in FIG. 8a. While locked into the engaged position, the flange 801 enforces a mandatory space between the mobile device and the user.

Figure 8B:
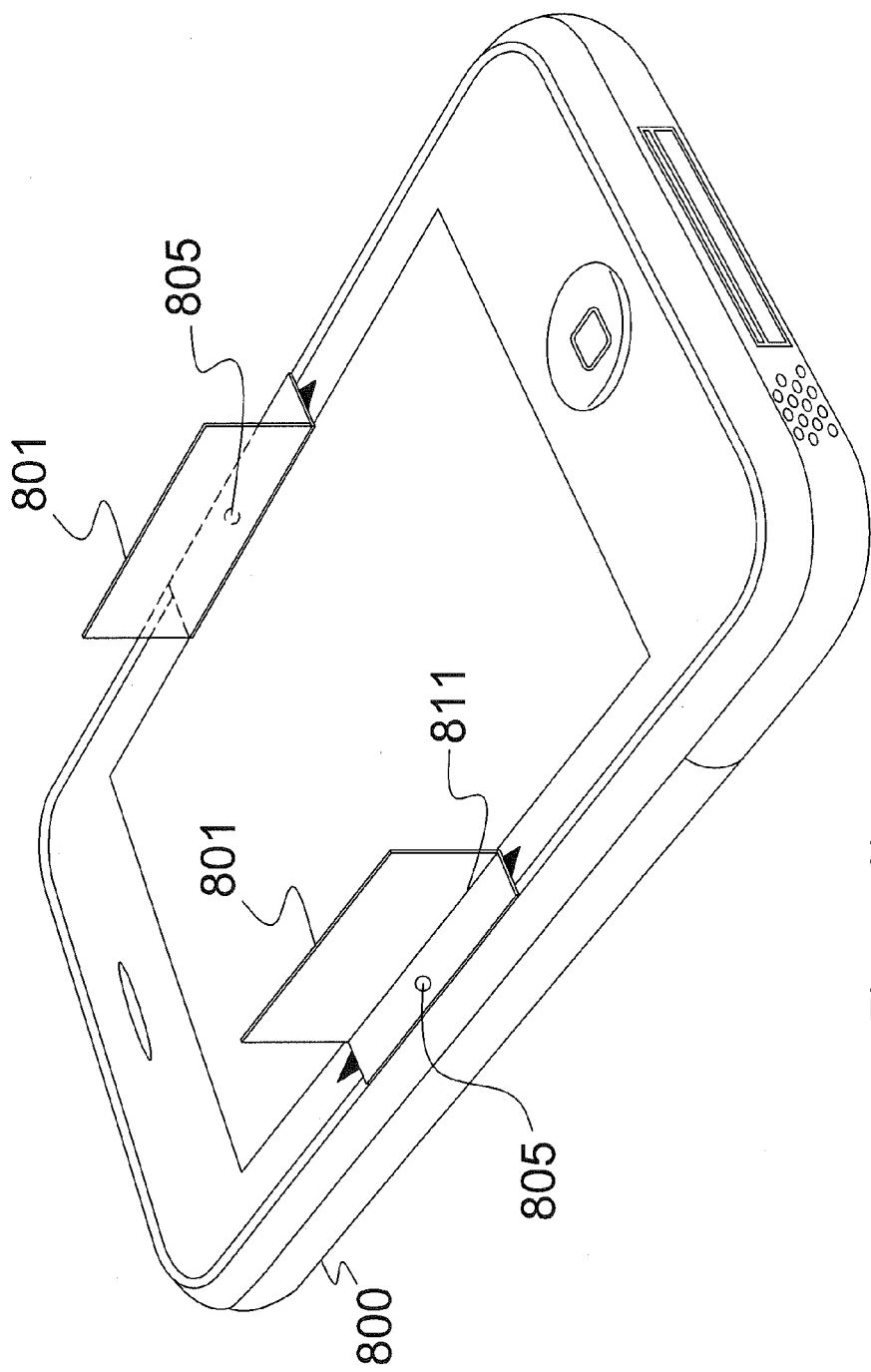

FIG. 8b also discloses a mobile device 800 with the hinged flanges 801, however in a deployed and locked position. The friction locks may be of a flexible variety which upon the application of sufficient downward pressure allow the flanges to be slowed. In the deployed state, the distance between the broadcast source and the users head may be brought into conformity with permissible SAR exposure by maintaining the distance between the mobile device and the user. The switch 805 as described early is depressed and allows broadcast transmissions as shown in FIG. 8b.

Figure 8C:
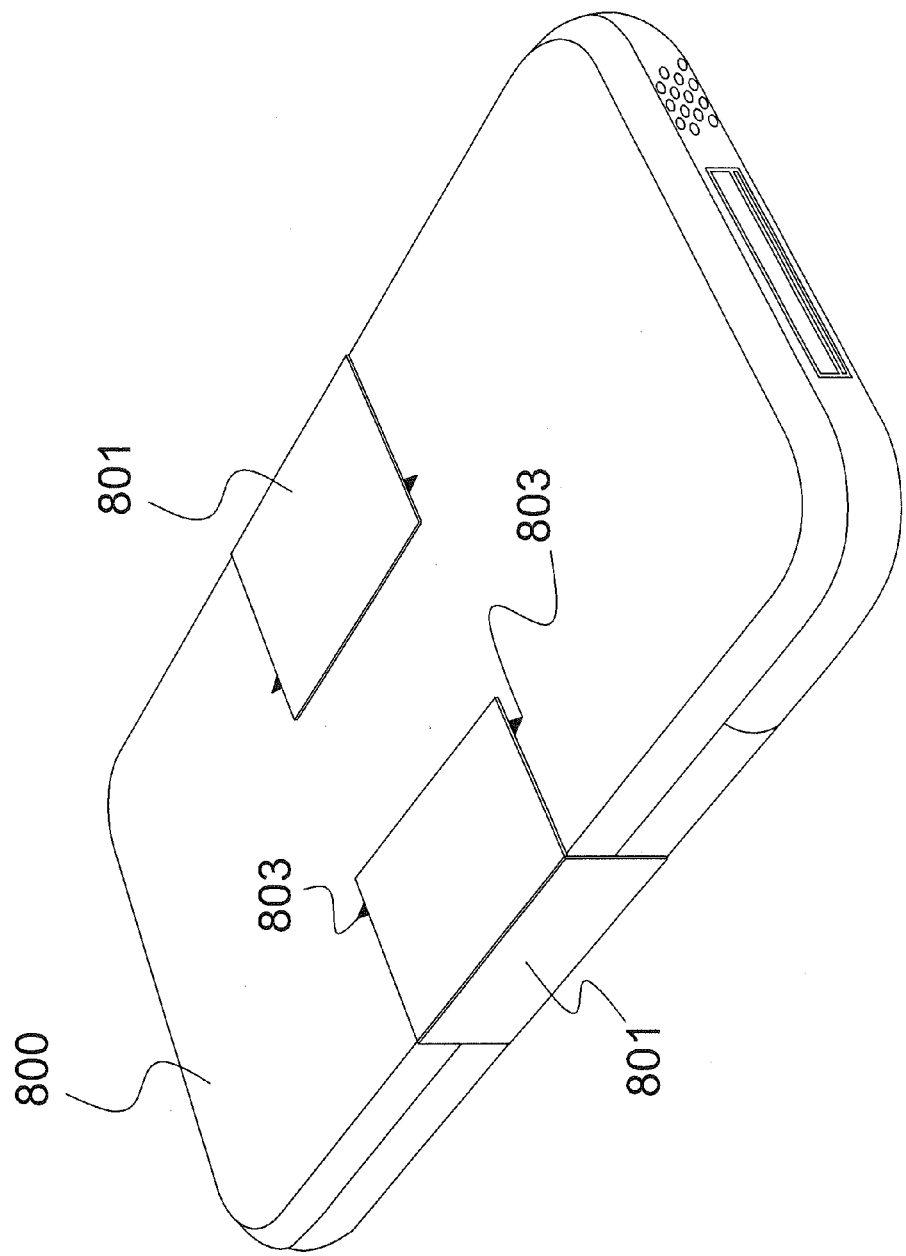
Figure 8D:
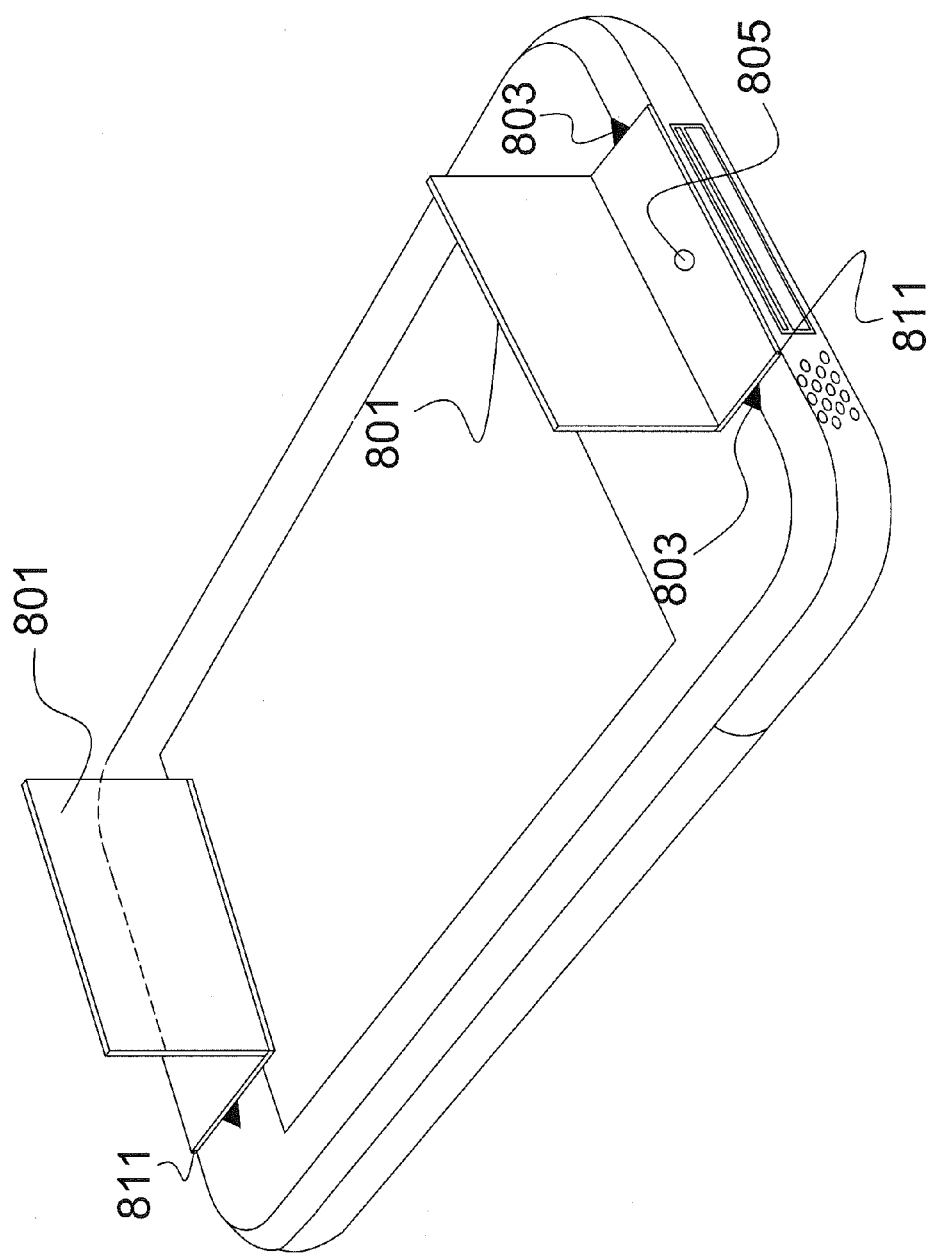
Figure 8E:
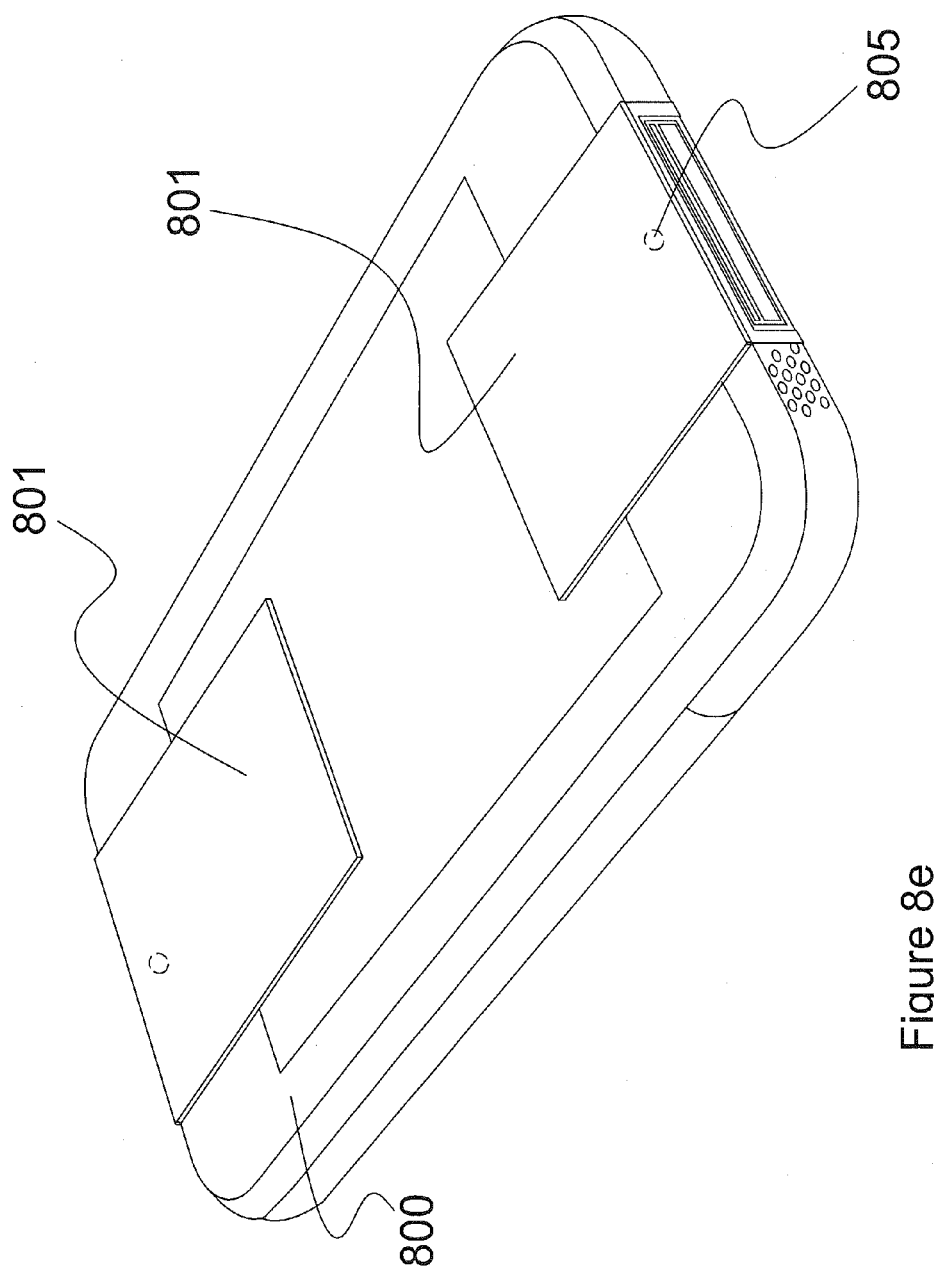

FIG. 8c shows a mobile device 800 with the hinged flange 801 in the stowed and locked condition and illustrates the appearance and utility of the device from the rear of the mobile device. Friction engaging retaining clips 803 or other fastening device may be used to secure the flange 801 in the stowed position. FIG. 8d shows a mobile device 800 with the hinged flange 801 in a deployed condition and thus with the switch 805 depressed with broadcast capacity activated but deployed at the top and bottom of the mobile device 800 rather than from the sides. The hinges 811 may be common hinges, flexible material such as cloth or plastic or other mechanical fastener which allows for the continuous cycling of the barriers from deployed to stowed. FIG. 8e shows the mobile device 800 with the hinged flanges 801 in stowed condition in the front rather than the rear or side and thus with the broadcast capacity inactive by depression of the switches 805. As noted the switches may enable/disable features of the mobile device by either being open or closed. The front fold variant may provide for lower cost levels. Additionally, it is envisioned that a permanent installation of plates (flanges) that provide from the minimum separation may be used, in such a configuration the broadcast switch would not be needed however the increase in bulkiness that may accompany such an embodiment may not be desirable to all. With the hinged embodiment by only allowing broadcast in the deployed condition, a minimum distance is maintained, signal absorption is significantly reduced and the overall dimensions may be minimized.

Figure 9A:
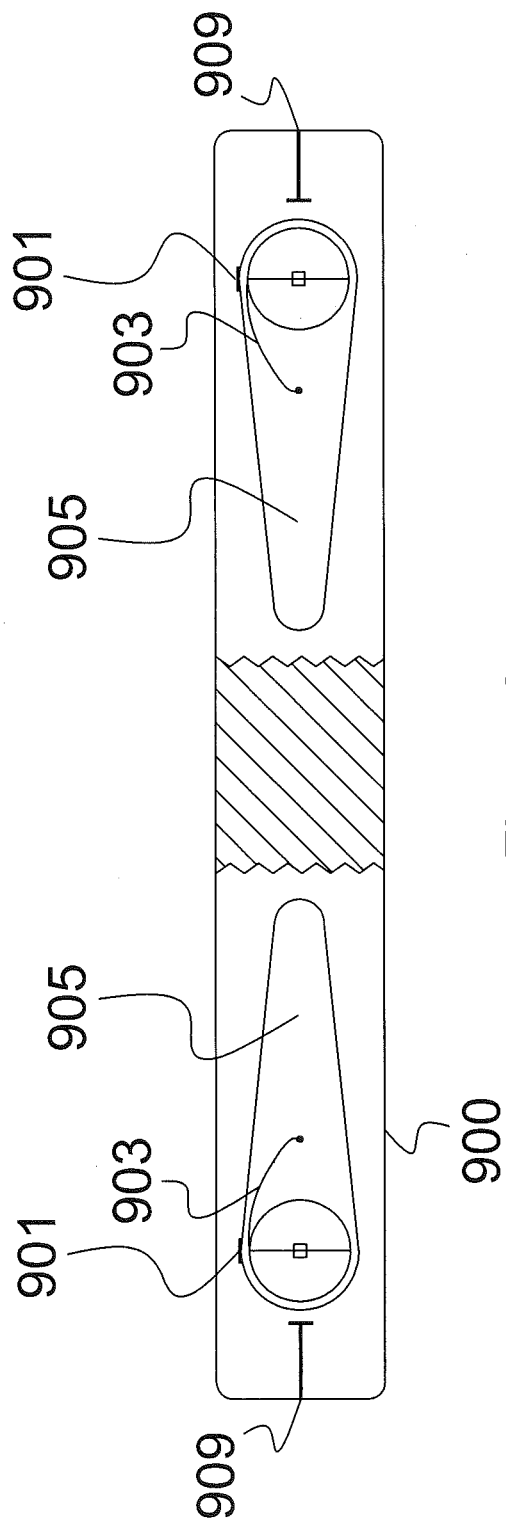
FIG. 9a-9c illustrate an embodiment of the subject matter with a spring loaded arm(s) to maintain the minimum distance of the mobile device from the user.
Figure 9B:
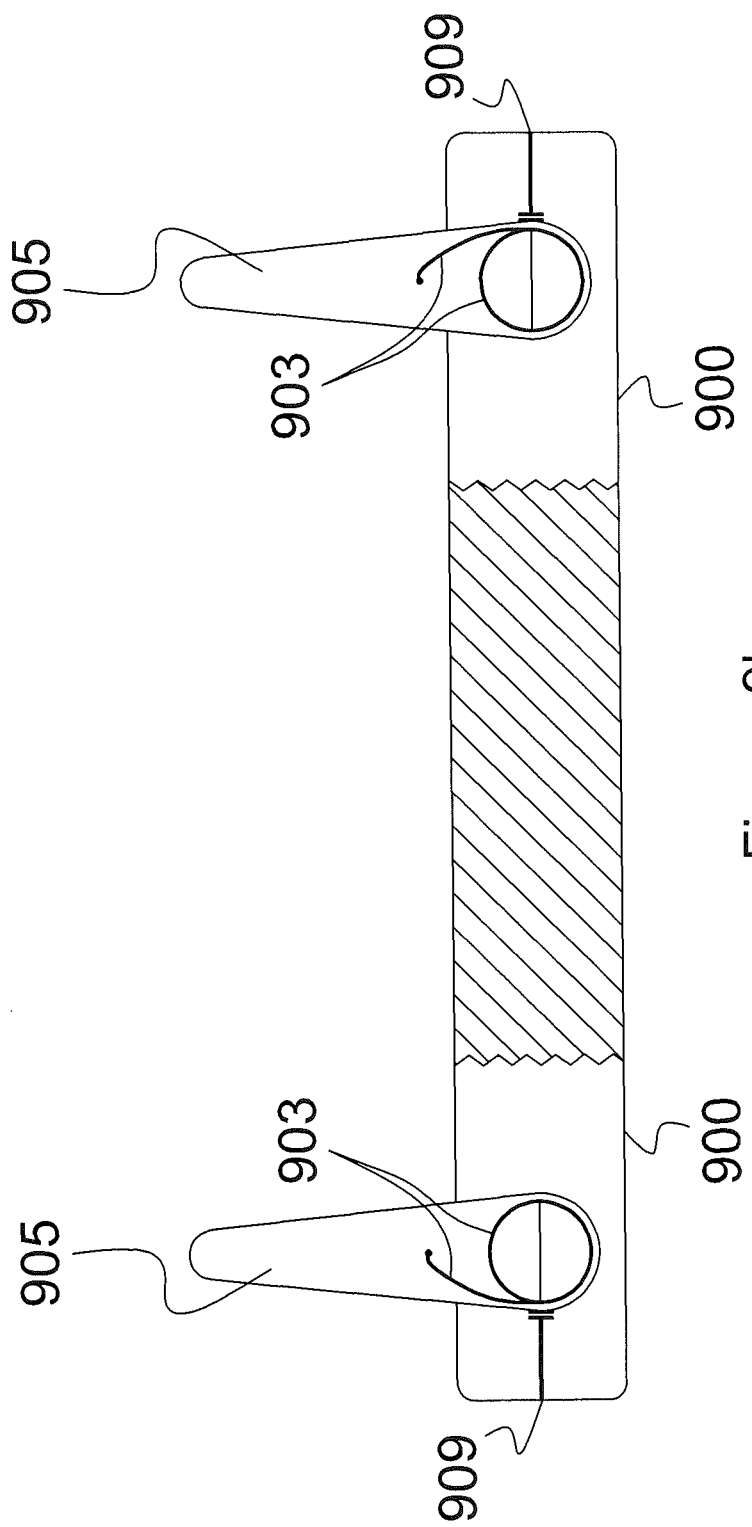
Figure 9C:
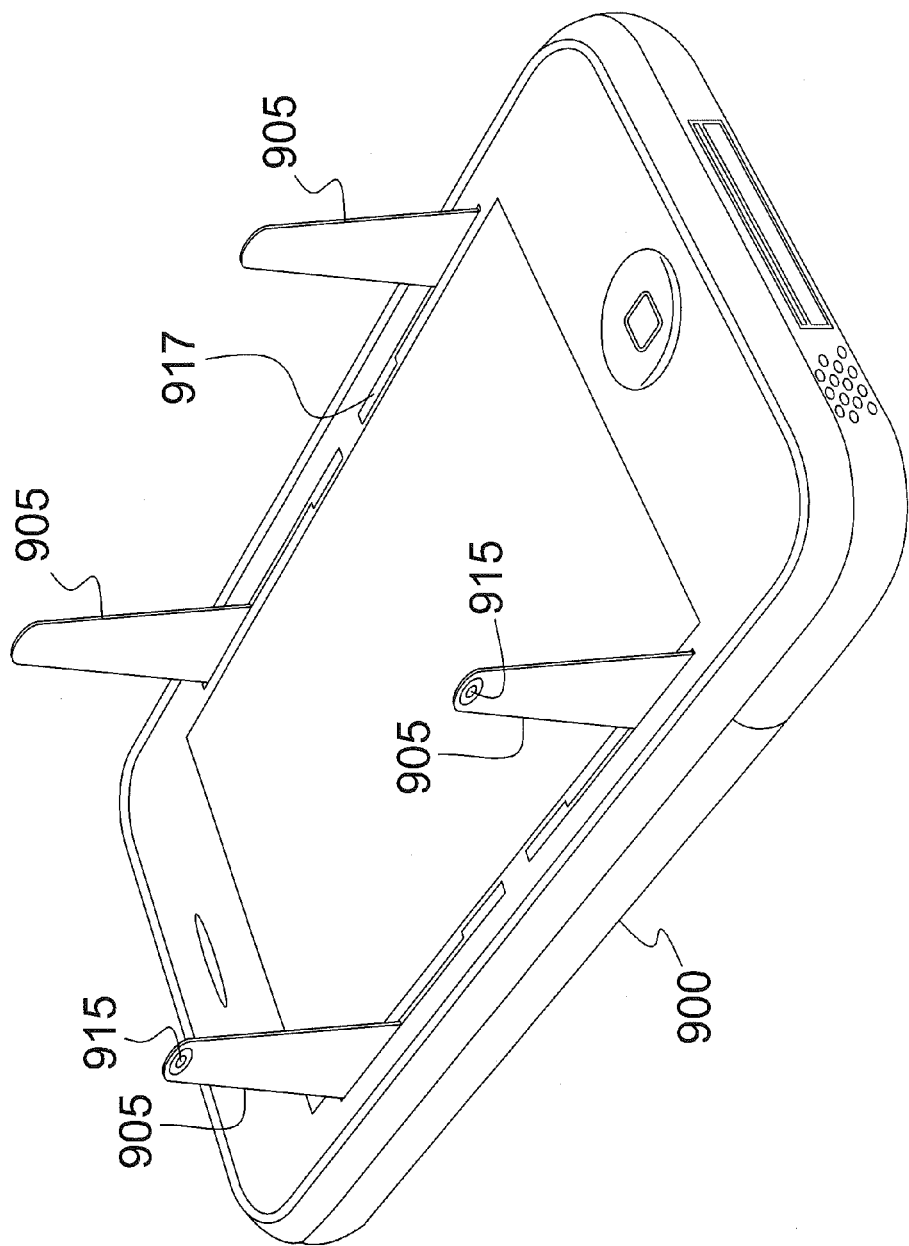

FIGS. 9a-c illustrate a mobile device 900 with a spring loaded arm(s) 905 to maintain the minimum distance from the user. FIG. 9 shows a mobile device 900 with a plurality of arms 905 for a physical barrier. For purposes of illustration, an anode 901 and a cathode 909 are illustrated such that when the arm 905 is fully extended and locked into position, the switch which results from the anode meeting the cathode is closed activating the circuit which allows broadcast. Activation and disablement of the broadcast ability as a result of deployment or storage of the physical barrier 905 (arms) may also be accomplished using other mechanical, hardware or software methods known in the art, such as light interruption or magnetic interference to list a few. The arms 905 may be bias deployed or stowed by spring 903.

FIG. 9b discloses the physical barrier arms in the deployed and locked condition. The friction locks may be of the flexible variety, such as by thickening of the arm or mast itself at its terminus, which bed sufficiently upon the application of moderate downward pressure by the end use such that the portion of the arm which generally conforms in width to the thickness of the device and is at a 90 degree angle from the plane of the faceplate side of the mobile device, so that the arm 905 locks into place activating a switch to allow broadcast communication from the device. In the deployed state, the distance between the broadcast source and the users head may be maintained at a minimum distance.

FIG. 9c shows the arms 905 of the physical barrier in a deployed condition in a perspective illustration of its deployment in a typical mobile device motif, showing with particularity the anticipated frictional latching. Latches 915 as shown biased buttons that retain the arms 905 when stowed in receptacles 917. The physical characteristics of the arms and deployment arrangements may vary from those disclosed and not depart from the disclosure if they readily maintain the minimum distance during broadcast of the mobile device. Other deployments such as telescoping, inflating and rotating are also envisioned.

Aspects of the disclosed subject matter include distance determination using sonic waves, radio waves, image detection, heat analysis, light refractions, or other methods. The warnings or alerts are envisioned to include audio, visual, tactile, thermal, and electrical indications. The warnings may also be accompanied or embodied by disconnection, disablement, enablement, attenuation, mode change, switching of antenna, modification of broadcast, change of protocol, etc of the radio device and/or operation.

An aspect of the disclosed subject matter is that the nature and amplitude of the warnings discussed above may also be a dynamic function of duration or distant and/or both. A threshold may also advantageously be incorporated. Time weights and exposure weights may also be incorporated into thresholds and used in comparing exposures to the thresholds.

An aspect of the disclosed subject matter is that the distance reference may be determined from the source of the transmitting antenna or generally from the device itself without regards to location of the transmitting antenna. The mechanism for determining distance may also detect type of material, i.e. flesh, fabric, this may be determined by using a plurality of wave frequencies coupled with their interaction with the type of material. For example certain frequency of sound waves or electromagnetic waves may be especially attenuated when reflected from soft tissue as opposed to a dash board, desk top or protective helmet. Analyzing the reflected waves or those waves which were not reflected may provide an indication of the material, and the risk of exposure to the user and in turn determining the type and nature of the warning.

Another aspect of the disclosed subject matter is that a bypass of the warning signal or interruption signal may be advantageously included in embodiments. In operations as described above when the exposure has surpassed a limit to such an extent as to cause a warning or interruption of communication, a bypass switch may be employed to override the warning/interruption for important or emergency calls. The bypass switch may be implemented as a manual switch, button, contact or as a voice command.

Still another aspect of the disclosed subject matter is that the broadcast required for communication control, such as reverse pilot signals, transmit and receive power control, identification, and time synchronization need not be encumbered by the implementation of the disclosed subject matter. Rather only those broadcasts where the payload is voice communication and thus the predominate mode of exposure is intended to be affected.

Yet another aspect of the disclosed subject matter is that the physical barriers described above may be made of metal, fiber, plastic or other durable material and may also serve to absorb or deflect radiation emanating from the mobile device. The physical barriers may also be biased in the deployed or stowed condition and may be deployed or stowed upon answering, hanging up, dialing, turning on, turning off the mobile device, based on the proximity to the user, or the angle of incident of the mobile device.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

I claim:

1. A method of preventing excessive exposure of a user from a mobile device during communication with the mobile device comprising
   emitting a wave from the mobile device;
   detecting a reflection of the emitted wave at the mobile device;
   determining based on the emitted wave and the reflected wave a proximity of the mobile device to the users head; and,
   comparing the proximity to a predetermined threshold and alerting the user if the threshold is exceeded, wherein the step of alerting the user further comprises adjusting an intensity of the alert based on the degree to which the threshold is exceeded.

* * * * *